(12) United States Patent
Sexton et al.

(10) Patent No.: US 7,093,263 B1
(45) Date of Patent: Aug. 15, 2006

(54) SYSTEM AND METHODOLOGY FOR SUPPORTING A PLATFORM INDEPENDENT OBJECT FORMAT FOR A RUN-TIME ENVIRONMENT

(75) Inventors: Harlan Sexton, Palo Alto, CA (US); David Unietis, Menlo Park, CA (US); Mark Jungerman, San Francisco, CA (US); Scott Meyer, Pacifica, CA (US); David Rosenberg, Los Altos, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

(21) Appl. No.: 09/512,621

(22) Filed: Feb. 25, 2000

Related U.S. Application Data

(60) Provisional application No. 60/160,759, filed on Oct. 21, 1999, provisional application No. 60/185,136, filed on Feb. 25, 2000, provisional application No. 60/185,139, filed on Feb. 25, 2000, provisional application No. 60/185,138, filed on Feb. 25, 2000, provisional application No. 60/185,134, filed on Feb. 25, 2000, provisional application No. 60/185,137, filed on Feb. 25, 2000, provisional application No. 60/185,135, filed on Feb. 25, 2000.

(51) Int. Cl.
*G06F 9/46* (2006.01)

(52) U.S. Cl. .................................................. 719/316
(58) Field of Classification Search ............... 709/316; 707/103; 719/316
See application file for complete search history.

(56) References Cited

U.S. PATENT DOCUMENTS

| | | | | |
|---|---|---|---|---|
| 5,717,919 | A * | 2/1998 | Kodavalla et al. | 707/8 |
| 5,784,553 | A * | 7/1998 | Kolawa et al. | 714/38 |
| 5,950,231 | A * | 9/1999 | Nichol | 711/170 |
| 5,987,031 | A * | 11/1999 | Miller et al. | 370/412 |
| 6,308,225 | B1 * | 10/2001 | Schofield | 719/316 |
| 6,480,877 | B1 * | 11/2002 | O'Donnell et al. | 718/100 |
| 6,615,266 | B1 * | 9/2003 | Hoffman et al. | 709/227 |

* cited by examiner

*Primary Examiner*—William Thomson
*Assistant Examiner*—Andy Ho
(74) *Attorney, Agent, or Firm*—Hickman Palermo Truong & Becker, LLP

(57) ABSTRACT

A computer-implemented method and software are provided for supporting a platform independent object format for a run-time environment in which a definition of an object in terms of a composition of one or more primitive types and a platform-specific description of the one or more primitive types are accessed. A layout for the object is then generated in a high-order language based on the definition of the object and the platform-specific description.

21 Claims, 3 Drawing Sheets

SYSTEM AND METHODOLOGY FOR SUPPORTING A PLATFORM INDEPENDENT OBJECT FORMAT FOR A RUN-TIME ENVIRONMENT

RELATED APPLICATIONS

The present application claims the benefit of the following U.S. Provisional Patent Applications, the contents of all of which are incorporated by reference in their entirety:

U.S. Provisional Patent Application Ser. No. 60/160,759 entitled USE OF A JAVA VM INSTANCE AS THE BASIC UNIT OF USER EXECUTION IN A SERVER ENVIRONMENT, filed on Oct. 21, 1999 by Harlan Sexton et al.;

U.S. Provisional Patent Application Ser. No. 60/185,136 entitled MEMORY MANAGEMENT USING MIGRATION FOR A RUN-TIME ENVIRONMENT, filed on Feb. 25, 2000 by Harlan Sexton et al.;

U.S. Provisional Patent Application Ser. No. 60/185,139 entitled METHOD AND ARTICLE FOR MANAGING REFERENCES BETWEEN OBJECTS IN MEMORIES OF DIFFERENT DURATIONS IN A RUN-TIME ENVIRONMENT, filed on Feb. 25, 2000 by Harlan Sexton;

U.S. Provisional Patent Application Ser. No. 60/185,134 entitled STATIC OBJECT SYSTEM AND METHODOLOGY FOR IMPLEMENTING A RUN-TIME ENVIRONMENT, filed on Feb. 25, 2000 by Harlan Sexton et al.;

U.S. Provisional Patent Application Ser. No. 60/185,134 entitled AURORA NATIVE COMPILATION, filed on Feb. 25, 2000 by Dmitry Nizhegorodov;

U.S. Provisional Patent Application Ser. No. 60/185,137 entitled ACCESSING SHORTER-DURATION INSTANCES OF ACTIVATABLE OBJECTS BASED ON OBJECT REFERENCES STORED IN LONGER-DURATION MEMORY, filed on Feb. 25, 2000 by Harlan Sexton et al.; and U.S. Provisional Patent Application Ser. No. 60/185,135 entitled HANDLING CALLOUTS MADE BY A MULTI-THREADED VIRTUAL MACHINE TO A SINGLE THREADED ENVIRONMENT, filed on Feb. 25, 2000 by Scott Meyer.

The present application is related to the following commonly-assigned, co-pending U.S. patent applications, the contents of all of which are incorporated by reference in their entirety:

U.S. patent application Ser. No. 09/248,295 entitled MEMORY MANAGEMENT SYSTEM WITHIN A RUN-TIME ENVIRONMENT, filed on Feb. 11, 1999 by Harlan Sexton et al.;

U.S. patent application Ser. No. 09/248,291 entitled MACHINE INDEPENDENT MEMORY MANAGEMENT SYSTEM WITHIN A RUN-TIME ENVIRONMENT, filed on Feb. 11, 1999 by Harlan Sexton et al.;

U.S. patent application Ser. No. 09/248,294 entitled ADDRESS CALCULATION OF INVARIANT REFERENCES WITHIN A RUN-TIME ENVIRONMENT, filed on Feb. 11, 1999 by Harlan Sexton et al.;

U.S. patent application Ser. No. 09/248,297 entitled PAGED MEMORY MANAGEMENT SYSTEM WITHIN A RUN-TIME ENVIRONMENT, filed on Feb. 11, 1999 by Harlan Sexton et al.;

U.S. patent application Ser. No. 09/320,578 entitled METHOD AND ARTICLE FOR ACCESSING SLOTS OF PAGED OBJECTS, filed on May 27, 1999 by Harlan Sexton et al.;

U.S. patent application Ser. No. 09/408,847 entitled METHOD AND ARTICLE FOR MANAGING REFERENCES TO EXTERNAL OBJECTS IN A RUNTIME ENVIRONMENT, filed on Sep. 30, 1999 by Harlan Sexton et al.;

U.S. patent application Ser. No. 09/512,619 entitled METHOD FOR MANAGING MEMORY USING EXPLICIT, LAZY INITALIZATION IN A RUN-TIME ENVIRONMENT, filed on Feb. 25, 2000 by Harlan Sexton et al.;

U.S. patent application Ser. No. 09/512,622 entitled METHOD FOR MANAGING MEMORY USING ACTIVATION-DRIVEN INITIALIZATION IN A RUN-TIME ENVIRONMENT, filed on Feb. 25, 2000 by Harlan Sexton et al.;

U.S. patent application Ser. No. 09/512,618 entitled METHOD AND APPARATUS FOR MANAGING SHARED MEMORY IN A RUN-TIME ENVIRONMENT, filed on Feb. 25, 2000 by Harlan Sexton et al.; and U.S. patent application Ser. No. 09/512,620 entitled USING A VIRTUAL MACHINE INSTANCE AS THE BASIC UNIT OF USER EXECUTION IN A SERVER ENVIRONMENT, filed on Feb. 25, 2000 by Harlan Sexton et al.

FIELD OF THE INVENTION

The present invention relates to computer systems and more particularly to managing memory for a run-time execution environment.

BACKGROUND OF THE INVENTION

A dynamic run-time environment for a language such as JAVA™ is responsible for managing memory for objects that are created and destroyed during the execution of a program. An object is an entity that encapsulates data and, in some languages, operations associated with the object. Since the encapsulated data is stored in memory, objects are associated with particular regions of memory that are allocated and deallocated by the dynamic run-time environment.

The state of a program, or "program state," is the set of the objects and the references between the objects that exist at a specific point in time during the execution of the program. A "reference" is used by a run-time environment to identify and ultimately access the region of memory for storing the data of the object. Typically, references between objects in a run-time environment are encoded using machine pointers. A machine pointer is a native object that contains the address of the object in the main memory, which can be a real memory address or, more commonly, a virtual address on a machine that implements a virtual memory system. Since machine pointers are closely coupled to the underlying hardware and firmware of a computer system, machine pointers have high performance and, hence, are a popular implementation for references.

In a run-time environment, however, managing the program state with machine-specific references such as machine pointers is sometimes disadvantageous. For example, it may be desirable to store the program state on disk or another secondary storage medium and restore the stored program state to main memory. Some run-time environments, in fact, are designed to use the same program state on different types of machines. For instance, such run-time environments provide load-balancing and crash recovery functions by transferring the execution of a program from one machine to another.

Differences between computer architectures make machine-independence very difficult to achieve. For example, the size of a machine pointer is dictated by the architecture of the computer system. While many computer systems today employ 32-bit machine pointers, older microprocessors typically used 16-bit machine pointers and the latest computer processors are adopting 64-bit pointers. On some 64-bit machines, such as a Cray™ supercomputer, all pointers are 64-bits long, and there is no native operation to fetch a smaller sized machine pointer. As another example, the significance and ordering of bytes in the pointer ("endianness") may vary from processor model to processor model.

One approach for addressing machine independence, known as "pointer swizzling," employs two completely different formats for representing references: a machine-dependent runtime format using pointers for references in main memory, and a platform invariant format for encoding references in secondary storage. When the reference is written to secondary storage, machine pointers are converted into a machine-independent symbol such as a string or a serial number. When the reference is read back into main memory from secondary storage, the symbol is unswizzled and converted back into a machine pointer. Swizzling is also referred to as "serialization" and "pickling."

The swizzling and the unswizzling operations, however, are computationally expensive, requiring many memory accesses into an auxiliary symbol table, typically implemented by a hash table or binary tree stored in memory. Thus, frequent storage and retrieval of program state into and out of secondary storage can be responsible for a significant drain on system performance. In addition, many conventional approaches are characterized by substantial manual coding, which is error-prone and renders the source code more difficult to maintain.

Therefore, a need exists for supporting a platform-independent format for object that does not require substantial manual coding, is error-prone, or renders the source code more difficult to maintain.

SUMMARY OF THE INVENTION

This and other needs are addressed by the present invention, in which a platform-independent format is defined for objects as a composition of primitive types for use with a platform-specific description of the primitive type. Thus, the object can automatically be laid out in a high-level language based on a definition for the object in terms of the primitive types and based on the platform-specific description of the primitive types. In addition, instructions can automatically be generated for getting and setting values in the object in the platform-independent format, thereby diminishing the reliance on manually coding the operations. As a result, errors are reduced and the code is more maintainable.

Accordingly, one aspect of the invention is a computer-implemented method and software for supporting a platform independent object format for a run-time environment, comprising the steps of: accessing a definition of an object in terms of a composition of one or more primitive types; accessing a platform-specific description of layout parameters of the one or more primitive types; and generating a layout for the object in a high-order language based on the definition of the object and the platform-specific description Still other objects and advantages of the present invention will become readily apparent from the following detailed description, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF THE DRAWINGS

The present invention is illustrated by way of example, and not by way of limitation, in the figures of the accompanying drawings and in which like reference numerals refer to similar elements and in which.

DESCRIPTION OF THE PREFERRED EMBODIMENT

A system and method for supporting a platform independent object format for a run-time environment are described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Hardware Overview

Figure 1:
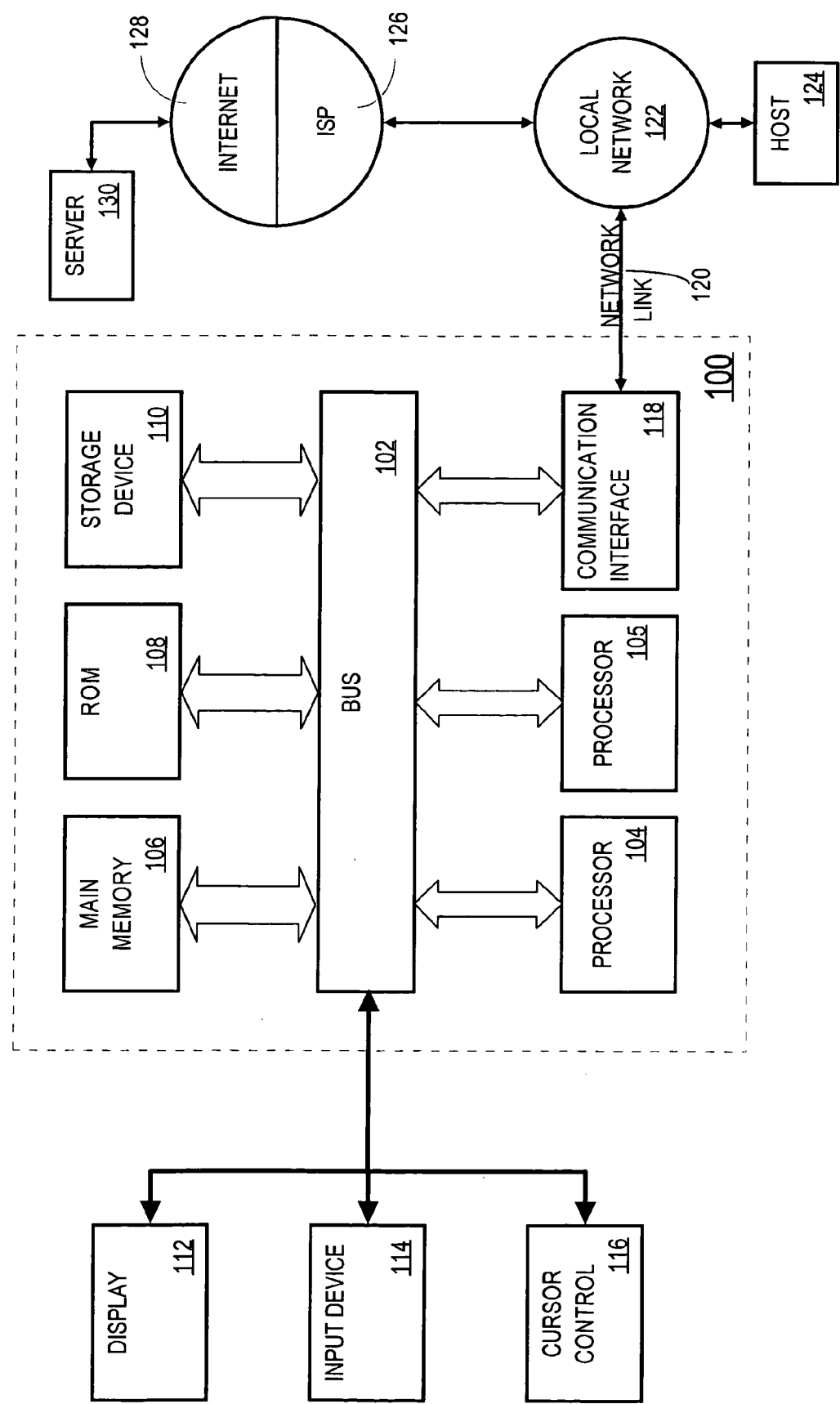
FIG. 1 depicts a computer system that can be used to implement the present invention.

FIG. 1 is a block diagram that illustrates a computer system 100 upon which an embodiment of the invention may be implemented. Computer system 100 includes a bus 102 or other communication mechanism for communicating information, and processors 104 and 105 both coupled with bus 102 for processing information. Computer system 1100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104 and processor 105. Computer system 100 further includes a read only memory (ROM) 108 or other static storage device coupled to bus 102 for storing static information and instructions for processor 104 and processor 105. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for supporting a platform independent object format for a run-time environment. According to one embodiment of the invention, supporting a platform independent object format for a run-time environment is provided by computer system 100 in response to processor 104 and/or processor 105 executing one or more sequences of one or more instructions contained in main memory 106. Such instructions may be read into main memory 106 from another computer-readable medium, such as storage device 110. Execution of the sequences of instructions contained in main memory 106 causes processor 104 and/or processor 105 to perform the process steps described herein. Although FIG. 1 depicts a dual processing arrangement with processors 104 and 105, one or more processors in a uni-processing or multi-processing arrangement, respectively, may also be employed to execute the sequences of instructions contained in main memory 106. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 and/or processor 105 for execution. Such a medium may take many forms, including but not limited to, non-volatile media, volatile media, and transmission media. Non-volatile media include, for example, optical or magnetic disks, such as storage device 110. Volatile media include dynamic memory, such as main memory 106. Transmission media include coaxial cables, copper wire and fiber optics, including the wires that comprise bus 102. Transmission media can also take the form of acoustic or light waves, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, and EPROM, a FLASH-EPROM, any other memory chip or cartridge, a carrier wave as described infra, or any other medium from which a computer can read.

Various forms of computer readable media may be involved in carrying one or more sequences of one or more instructions to processor 104 and/or processor 105 for execution. For example, the instructions may initially be borne on a magnetic disk of a remote computer. The remote computer can load the instructions into its dynamic memory and send the instructions over a telephone line using a modem. A modem local to computer system 100 can receive the data on the telephone line and use an infrared transmitter to convert the data to an infrared signal. An infrared detector coupled to bus 102 can receive the data carried in the infrared signal and place the data on bus 102. Bus 102 carries the data to main memory 106, from which processor 104 and/or processor 105 retrieves and executes the instructions. The instructions received by main memory 106 may optionally be stored on storage device 110 either before or after execution by processor 104 and/or processor 105.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the worldwide packet data communication network, now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120, and communication interface 118. In the Internet example, a server 130 might transmit a requested code for an application program through Internet 128, ISP 126, local network 122 and communication interface 118. In accordance with the invention, one such downloaded application provides for supporting a platform independent object format for a run-time environment as described herein. The received code may be executed by processor 104 as it is received, and/or stored in storage device 110, or other non-volatile storage for later execution. In this manner, computer system 100 may obtain application code in the form of a carrier wave.

"Virtual memory" refers to memory addressable by a storage allocation technique in which auxiliary storage, such as memory in storage device 110, can be addressed as though it were part of the main memory 106. More specifically, combinations of hardware, firmware, and operating system cooperate to automatically swap portions of the code and data for an executing process on an as-needed basis. Thus, the virtual address space may be regarded as addressable main memory to a process executing on a computer system that maps virtual addresses into real addresses. The size of the virtual address space is usually limited by the size of a native machine pointer, but not by the actual number of storage elements in main memory 110.

On many operating systems, a process will utilize a certain amount of virtual memory that no other user process may access in order to provide data security. "Shared memory" refers to the virtual address space on the computer system 100 that is concurrently accessible to a plurality of executing user processes on a processor 104. In some embodiments, shared memory is also accessible to executing user processes on a plurality of processors, such as processors 104 and 105.

"Secondary storage" as used herein refers to storage elements, other than virtual memory, accessible to a process. Secondary storage may be local or networked. Local secondary storage, furnished by storage device 100 on computer system 100, typically takes the form of a random access storage device such as a magnetic or optical disk. Networked secondary storage is provided by storage devices on other computer systems, for example on host 124, accessible over a local area network 122, or server 130, accessible over a wide area network such as the Internet.

A Platform Independent Object Format

In accordance with one aspect of the invention, each object used in a run-time environment is implemented as a sequence of slots, each slot containing a primitive type. Most of the primitive types, including integers (signed and unsigned), floating point numbers, characters, booleans, etc., are readily implementable on a variety of platforms. For example, a floating point number may be specified as an IEEE single or double precision floating point number, which has a canonical representation that is invariant across platforms.

A reference, however, is a primitive type that does not conventional have a platform-independent canonical format. For example, references are typically implemented as native machine pointers, which are about as platform-specific as they can be. Therefore, numeric references are used to provide a platform-independent representation for references.

A numeric reference employs a machine-independent format for encoding references between objects that is suitable for both run-time use in virtual memory and storage use in secondary storage. Unlike symbols and strings employed with pointer swizzling, numeric references are easily stored in a secondary storage, in some cases needing no conversion at all and in other cases requiring only minor arithmetic-logical operations such as bit-twiddling and byte rearrangement. For run-time usage, numeric references can be efficiently "dereferenced," that is, converted into a machine pointer, without requiring many memory accesses into an auxiliary symbol table, hash table, tree, or other complex data structure. Therefore, numeric references need not be converted into machines at load time, reducing the overhead of loading program state.

Preferably, numeric references are implemented in a run-time environment that requires all encoded data (e.g. for objects) to be strongly typed and all primitive types, including references, to have an invariant format. For example, a run-time environment may require floating point numbers to use an IEEE format. In such a run-time environment, references between objects, conventionally implemented by machine pointers, are encoded as integer values indicating offsets from an implicit machine pointer. The numeric reference is defined to be invariant, having a specified number of bytes, a specified byte-ordering, and a specified alignment. The implicit machine pointer is a virtual address that is derivable from the memory environment of one the objects.

For example, numeric references may be encoded as a little endian, two's complement (if signed) four-byte integer referring to objects aligned on an eight-byte boundary, although numeric references in accordance with the present invention, of course, are not limited to these particular specifications. Since almost all machines provide a mapping between a numeric type and a native primitive type, accessing data in this format is at least as efficient as, for example, accessing structures generated by C compilers for that machine.

The use of numbers to encode references stems from the realization that the invariant format for encoding objects and primitive types in a run-time environment ensures that every instance of a type will have the same size between platforms. Since every object has a consistent size between platforms, the relative locations between objects are also consistent. Since objects on any platform will be located at a consistent offset from some point in the virtual address space, this offset can be expressed as a consistent number of bytes from a virtual address. Thus, numeric references include an offset portion that indicates a number of bytes from an implicit address. Consequently, numeric references are machine-independent, and program state with numeric references can be used on incompatible processors, such as processors with differently sized machine pointers.

Since a process may use some of its virtual address space for storing non-invariant data, i.e. for purposes other than storing program state, it is useful to define a physical or logical area of the virtual address space in which the offsets between objects remain consistent and thus can be advantageously expressed as numbers. An "object memory" is a subset of the virtual address space containing either existing objects or available space for allocating new objects. Since an object memory is a subset of the virtual address space, numeric references within the object memory can be smaller than machine pointers. For example, 32-bit (four-byte) numeric references can be profitably used on a computer with a 64-bit virtual address space ($2^{64}$, about 16 billion gigabytes). Since one of the impediments to machine-independence is the differing sizes of machine pointers, the use of fixed-size numeric references, even in very large virtual address spaces, helps in attaining a machine-independent reference format.

In some implementations, a plurality of object memories are provided, for example, to hold objects of different durations, or of other distinct characteristics, to assist in garbage collection. Accordingly, numeric references encode references between objects in the same object memory. References between objects of different object memory, on the other hand, would be encoded in another reference format having the same size as the numeric reference. For example, indexed references, which are described infra, are one type of format that may be used for such inter-object memory references.

In contrast to symbols swizzled from machine pointers, numeric references are easily converted into and from machine pointers. In general, a numeric reference to an object is converted into a machine pointer to the object by adding an offset contained in the numeric reference to an implicit virtual address. Conversely, a machine pointer to the object is converted into a numeric reference by calculating a pointer difference between the machine pointer to the object and the implicit virtual address. The implicit virtual address points to the beginning of a region of the virtual memory space in which the referencing object or the referenced object is located. The precise identity of the implicit virtual address depends more specifically on the species of the numeric reference that is employed.

Three numeric references include: (1) a base-offset numeric reference, which contains an offset relative to a "base address" at the beginning of the object memory, especially if the object memory consists of a contiguous segment of memory, (2) a page-offset numeric reference that is relative to the start of a page also specified in the numeric reference, and (3) a self-relative numeric reference that is relative to the beginning of the referencing object.

A Meta-Object System

Although numeric references, in combination with other primitive types, enable an object to be stored in a platform-independent format so that programs executing on incompatible platforms can readily use the object without swizzling, the different platforms typically require different high-level instructions to access the same slot.

For example, if a platform does not have a 4-byte primitive integer (e.g. on 64-bit machines such as the Cray YP-1), the slot for a primitive 4-byte integer type would be declared as an array of four bytes. In such a case, high-level language instructions for fetching a value from the slot would require instructions for fetching individual bytes at a time, shifting the bytes by an appropriate amount, and adding or logically oring the shifted bytes to an accumulated result, e.g. the C programming language instructions: result=((slot[0]<<24)|(slot[1]<<16)|(slot[2]<<8)|slot[3]). On the other hand, if the platform does indeed support a native 4-byte integer, for example, by a C programming language int on a 32-bit machine, then the high-level language instructions would be simple, such as the C programming language expression: result=slot.

Furthermore, the high-level language code to lay the object out can differ from platform to platform, and even from compiler to compiler. For example, all native pointers on certain 64-bit platforms may be 64-bits wide; thus, a machine pointer type slot would require eight bytes in such 64-bit architectures to hold the pointer. On many 32-bit machines, however, pointers are 32-bits wide. Thus, four bytes of padding has to be explicitly reserved in that case for a pointer slot to have the same size in both 32-bit and 64-bit architectures. Therefore, the high-level language definitions for objects, for example C programming language declarations for objects, would vary from platform to platform, even though the object employs the same platform-independent format.

Consequently, different high-level language code would have to be employed in each different platform-specific implementation. When the source code for the run-time environment involves hundreds of thousands, if not millions, of lines of code, manually coding each of the different ways to layout, access, and modify objects is error-prone and ugly. Therefore, there is a need for a mechanism to automatically generate the appropriate layout, access, and modify instructions for a variety of supported platforms.

Accordingly, one aspect of the invention is related to a meta-object system and code generation facility that automatically generates appropriate high-level language instructions for laying out, accessing, and modifying the slots of the object based on platform-specific descriptions of primitive types. For example, the meta-object system and code generation facility can generate C programming language macros, C++ inline functions, or other kinds of subroutines, procedures, and functions appropriate to the high-level language compiler for the different platforms. In addition, some embodiments of a meta-object system and code generation facility can generate appropriate high-level language instructions for implementing generic functions in support of method dispatching.

Figure 2:
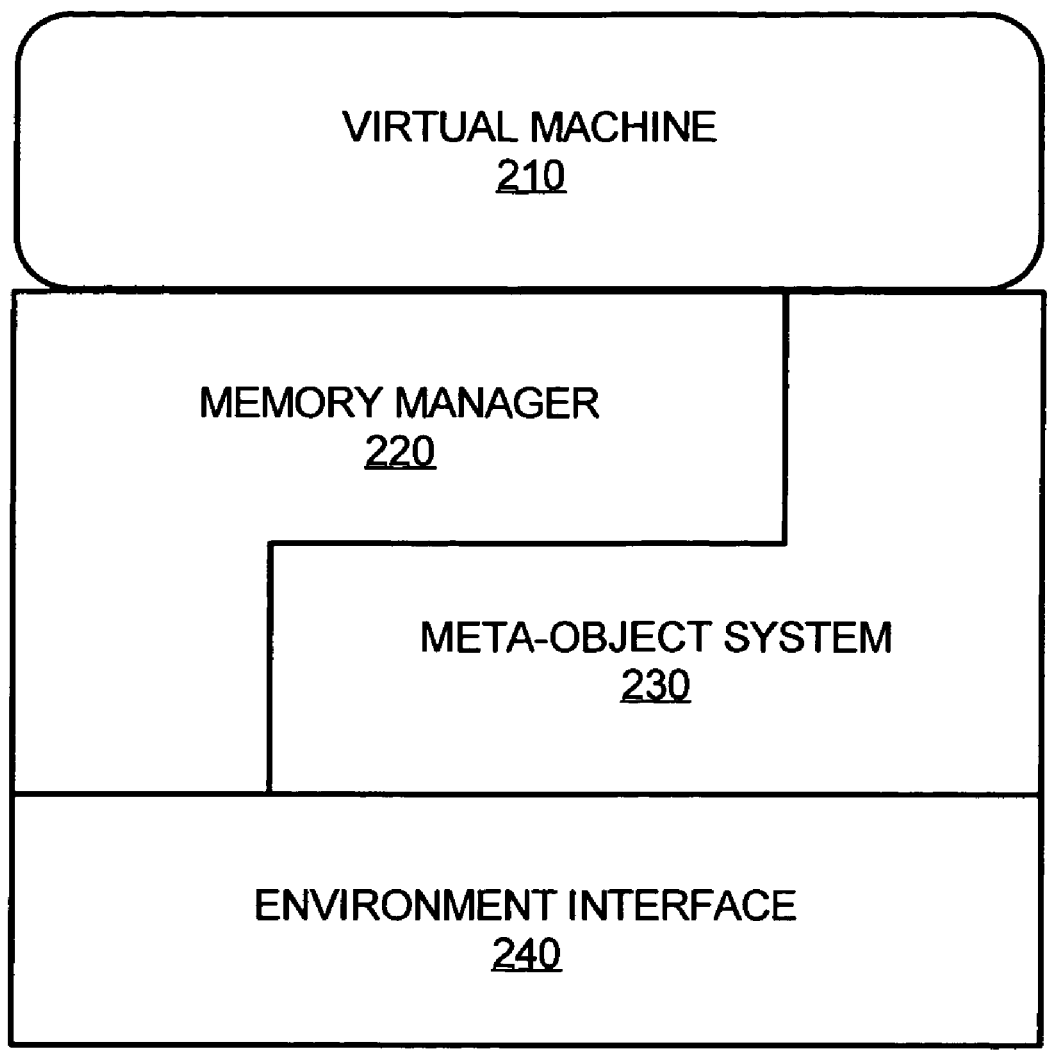
FIG. 2 is a conceptual diagram of a run-time environment in accordance with one embodiment of the present invention.

Referring to FIG. 2, depicted is a conceptual diagram that illustrates the relationship of a meta-object system 230 with respect to other components of a run-time environment. The bottom layer, the environment interface 240, insulates the run-time environment from the "outside" world as by providing an encapsulation and interface to operating system calls. The memory manager 220 and the meta-object system 230 together provide a foundation on which the rest of the virtual machine 210 is implemented. The virtual machine 210, for example, can be a JAVA™ virtual machine. The area of overlap between the memory manager 220 and the meta-object system 230 is reflected in the reference model used by objects in the virtual machine 210.

For example, the reference model can require objects of a short duration to be implemented in a native high-level language format for reasons of efficiency, because recently created objects are more likely to be used. On the other hand, the reference model would require objects of a longer duration to be implemented in a platform-independent format for reasons of ease of portability, because longer lasting objects are more likely to be persistent and used by another process, even by one on another computer. Therefore, the memory manager 220 and the meta-object system 230 serve to cooperate in allocating, deallocating, and migrating objects to the appropriate memory. For instance, an object can be allocated by the memory manager 220 in a short duration memory in a native format controlled by the meta-object system 230 and then later migrated to a longer duration memory in a platform-independent format.

Platform-Independent Object Format Support

Figure 3:
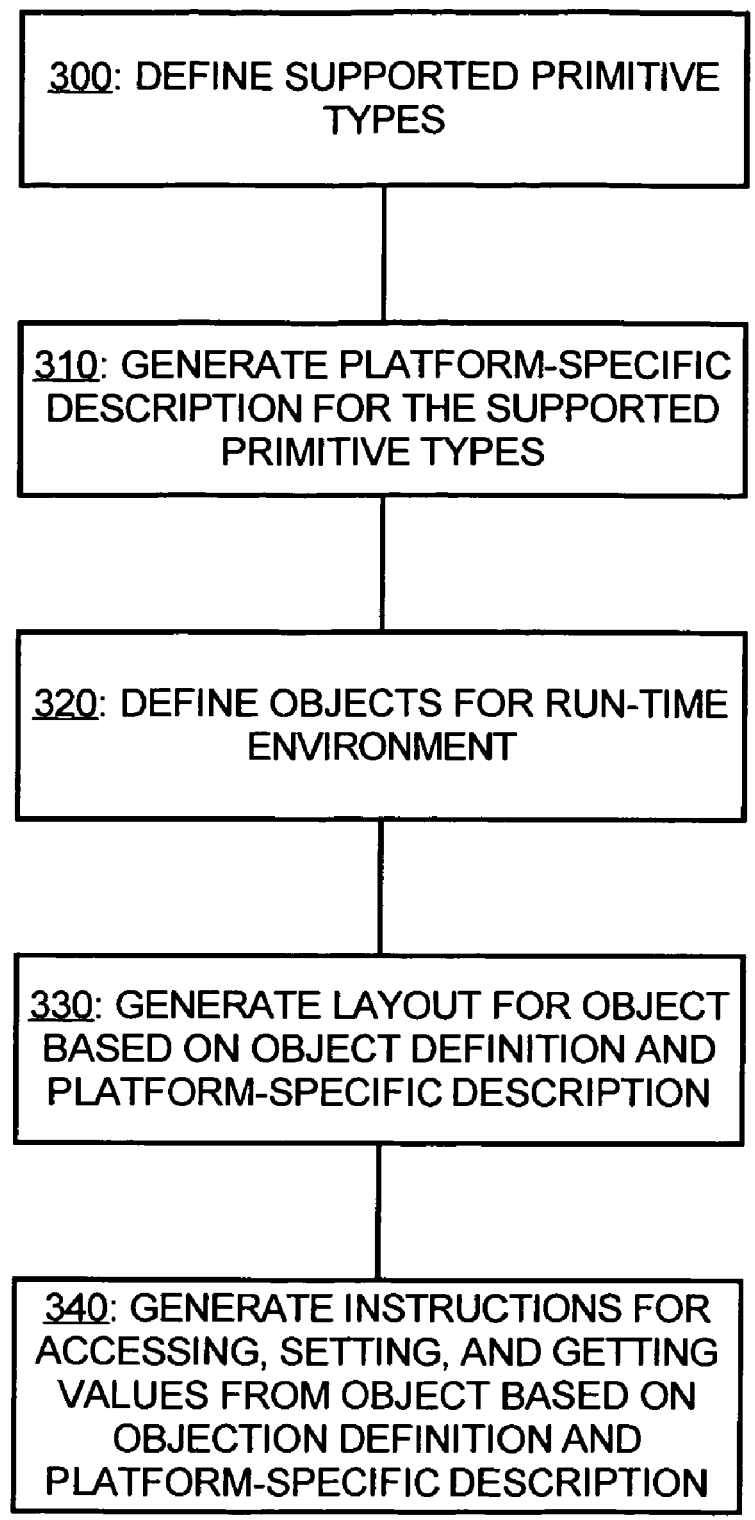
FIG. 3 is a flow diagram of supporting platform-independent object formats in accordance with one embodiment of the present invention.

FIG. 3 is a flow diagram that illustrates supporting a platform-independent object format in accordance with one embodiment of the invention. At block 300, the designer of the meta-object system decides which primitive types are supported and what their platform-independent representations should be. In one implementation, for example, the following primitive types are defined: integer types (e.g. one, two, four, and eight-byte signed and unsigned integers), floating point types (e.g. single and double precision IEEE standard floating point numbers), character types (e.g. one, two, and four byte characters), object reference types (e.g. in native machine pointer and numeric reference formats), foreign pointer data types (used, e.g. to reserve space for caching a pointer value strictly during runtime in an otherwise platform-independent format object), boolean types, and derived types (e.g. a header type derived from an unsigned four-byte int and a length type to hold the length of variable length objects, also derived from an unsigned four-byte).

In addition, the platform-independent formats of the primitive types are also designed for a set of desired platforms upon which the run-time environment is ported to run. For example, a "ub4" (four-byte unsigned integer) can be specified to hold exactly four bytes. As another example, a single float is specified in accordance with the IEEE standards. Generally, the alignment and space restrictions of the most restrictive supported platforms are taken into account. For example, if 64-bit machines such as the Cray YP-1 is to be supported, then the platform-independent format should reserve at least 8 bytes for the foreign pointer value.

At block 310, a platform-specific description of the supported primitive types is produced. The platform-specific description specifies at least the size and alignment restrictions of the primitive types for the specific platform. This description can be created by hand, or automatically generated by a configuration program. For example, in the C programming language, the configuration program is coded to determine the size of every C native type, such as char, unsigned char, short, unsigned short, int, long, void *, float, double, etc. by the sizeof operator and determine the alignment restrictions by creating structs with these types aligned after a single char and examining the field offsets.

At block 320, a desired object for the run-time environment is defined. In one embodiment, a Scheme-like language is used to define objects, but other syntactical notations may also be used. For example, an implementor may define a binary tree node as follows:

```
(define-object eotnode
    (super eobject)
    (desc "a binary tree node")
    (slots (left eoref) (right eoref) (data eoref)))
```

In this definition, a binary tree node is specified to be derived from the eobject superclass and contains the three slots, all which are primitive references.

At block 330, a layout in a high-level language for the defined object is generated based on the object definition and the platform-specific description. In this block, each slot is laid out with the size and alignment previously defined in step 300. In addition, the layout for the defined object can be done both in native format (e.g. for shorter durations) and platform-independent format (e.g. for longer durations). For example, a native format layout in the C programming language may be as follows:

```
struct eotnode__ptr
{
    ub4 hdr;        // with: typedef unsigned int ub4;
    eobject* left;
    eobject* right;
    eobject* data;
}
```

However, the same object may be laid out for platform-independent format on a typical 32-bit machine as follows, wherein a numeric reference is defined to be four bytes:

```
struct eotnode__nref
{
    ub4 hdr;        // with: typedef unsigned int ub4;
    ub4 left;
    ub4 right;
    ub4 data;
}
```

Yet, on a 64-bit machine, in which all native C programming language ints are at least 8-bytes, the native integers are four bytes too many, so the following layout may be generated, in which each numeric reference is laid out as a four-byte array:

```
struct eotnode__nref
{
    ub1[4] hdr;     // with: typedef unsigned char ub1;
    ub1[4] left;
    ub1[4] right;
    ub1[4] data;
}
```

In the later case, the layout generator was able to determine that the standard ub4 (unsigned int) type is too large on a 64-bit machine, e.g. determined by creating a ub4 in a test configuration C program and performing a sizeof operation on the ub4, which yields eight as an answer on a 64-bit machine.

As another example, a foreign pointer may be laid out as a simple pointer on a 64-bit machine, but as a ub4-sized padding followed by a 32-bit pointer on a 32-bit machine.

At block 340, instructions for accessing, setting, and getting values from the object are generated based on the object definition and the platform-specific description. These instructions can be generated in the form of C macros or functions, C++ inline functions, or any other kind of routine that is appropriate in a high-level language. For example, an "accessor" is generated, which returns an "rval" of the slot value, for example, with the following signature: eoref eotnode_data(eocontext* ctx, eotnode* obj). In this case, the accessor routine comprises instructions for fetching a reference from the slot. For platform-independent objects on a 32-bit platform, these instructions may involve simply fetching the numeric reference value and dereference the numeric reference into a native pointer, while on a 64-bit platform, the numeric reference value is fetched by getting and shifting one byte at a time from an array of four bytes.

Similarly, "getter" routines can be generated, preferably as macros or other inline functions, in which the slot is fetched and processed inline. One syntax for a getter is as follows: eotnode_get_data (ctx, obj). A "setter" is used to store a value in a slot and performs the appropriate manipulations to put the value into the right format, including conversion of a machine pointer into a numeric reference if need. One exemplary syntax is: eotnode_set_data(eocontext* ctx, eotnode* obj, eoref val).

While this invention has been described in connection with what is presently considered to be the most practical and preferred embodiment, it is to be understood that the invention is not limited to the disclosed embodiment, but on the contrary, is intended to cover various modifications and equivalent arrangements included within the spirit and scope of the appended claims.

What is claimed is:

1. A method for supporting a platform independent object format for a run-time environment, comprising the computer-implemented steps of:
    accessing a definition of an object in terms of a composition of one or more primitive types;
    accessing a platform-specific description of size and alignment of the one or more primitive types; and
    generating a layout for the object in a high-order language based on the definition of the object and the size and alignment of the one or more primitive types.

2. The method according to claim 1, further comprising the step of generating instructions for an accessor operation to access a slot in the object holding a value for one of the one or more primitive types.

3. The method according to claim 1, further comprising the step of generating instructions for a get operation to fetch a value for one of the one or more primitive types from a slot in the object.

4. The method according to claim 1, further comprising the step of generating instructions for a set operation to store a value for one of the one or more primitive types from a slot in the object.

5. The method according to claim 1, wherein the one or more primitive types includes one or more of the following types: integer, floating point, and reference.

6. The method according to claim 5, wherein the primitive reference type is one of a native machine pointer type and a numeric reference type.

7. A method for supporting an object format for a plurality of incompatible platforms for a run-time environment, comprising the computer-implemented steps of:
    accessing a definition of an object as a plurality of slots containing a primitive type;

accessing a plurality of platform-specific descriptions of layout parameters of the one or more primitive types, said platform-specific descriptions corresponding respectively to the incompatible platforms; and generating a plurality of layouts, corresponding respectively to the incompatible platforms, for the object in a high-order language based on the definition of the object and the platform-specific descriptions.

8. The method according to claim 7, where the slots are located in the layouts for the incompatible platforms, when compiled by a corresponding platform-specific compiler, at same offsets.

9. A computer-readable storage medium bearing instructions for supporting a platform independent object format for a run-time environment, said instructions being arranged to cause one or more processors upon execution thereby to perform the steps of:

accessing a definition of an object in terms of a composition of one or more primitive types;

accessing a platform-specific description of size and alignment of the one or more primitive types; and generating a layout for the object in a high-order language based on the definition of the object and the size and alignment of the one or more primitive types.

10. The computer-readable storage medium according to claim 9, wherein said instructions are further arranged for performing the step of generating instructions for an accessor operation to access a slot in the object holding a value for one of the one or more primitive types.

11. The computer-readable storage medium according to claim 9, wherein said instructions are further arranged for performing the step of generating instructions for a get operation to fetch a value for one of the one or more primitive types from a slot in the object.

12. The computer-readable storage medium according to claim 9, wherein said instructions are further arranged for performing the step of generating instructions for a set operation to store a value for one of the one or more primitive types from a slot in the object.

13. The computer-readable storage medium according to claim 9, wherein the one or more primitive types includes one or more of the following types: integer, floating point, and reference.

14. The computer-readable storage medium according to claim 13, wherein the primitive reference type is one of a native machine pointer type and a numeric reference type.

15. A computer-readable storage medium bearing instructions for supporting an object format for a plurality of incompatible platforms for a run-time environment, said instructions being arranged to cause one or more processors upon execution thereby to perform the steps of:

accessing a definition of an object as a plurality of slots containing a primitive type;

accessing a plurality of platform-specific descriptions of layout parameters of the one or more primitive types, said platform-specific descriptions corresponding respectively to the incompatible platforms; and generating a plurality of layouts, corresponding respectively to the incompatible platforms, for the object in a high-order language based on the definition of the object and the platform-specific descriptions.

16. The computer-readable storage medium according to claim 15, wherein the slots are located in the layouts for the incompatible platforms, when compiled by a corresponding platform-specific compiler, at same offsets.

17. The method according to claim 8, wherein:

one of the platform-specific descriptions corresponding to one of the incompatible platforms specifies that the primitive type has a first size;

another of the platform-specific descriptions corresponding to another of the incompatible platforms specifies that the primitive type has a second size greater than the first size; and said generating the layouts includes:
generating one of the layouts corresponding to said one of the incompatible platforms;
generating another of the layouts corresponding to said another of the incompatible platforms; and
generating a padding element in said one of the layouts.

18. The computer-readable storage medium according to claim 16, wherein:

one of the platform-specific descriptions corresponding to one of the incompatible platforms specifies that the primitive type has a first size; and another of the platform-specific descriptions corresponding to another of the incompatible platforms specifies that the primitive type has a second size greater than the first size; and said generating the layouts includes:
generating one of the layouts corresponding to said one of the incompatible platforms;
generating another of the layouts corresponding to said another of the incompatible platforms; and
generating a padding element in said one of the layouts.

19. A method for supporting an object format for a run-time environment, comprising the computer-implemented steps of:

accessing a definition of an object as including at least one slot containing a primitive type;

accessing a first layout description for the primitive type corresponding to a first platform;

generating a first layout for the slot of the object in a high-order language based on the definition of the object and the first layout description; and accessing a second layout description for the primitive type corresponding to a second platform; and generating a second layout for the slot of the object in a high-order language based on the definition of the object and the first layout description;

wherein the first layout for the slot and the second layout for the slot have a same size when compiled by a first compiler of the high-order language on the first platform and a second compiler of the high-order language on the second platform; and the first layout for the slot of the object in the high-order language includes a padding element and the second layout for the slot of the object in the high-order language does not include the padding element.

20. The method according to claim 19, wherein:

the first layout description for the primitive type specifies a first size for the primitive type; and the second layout description for the primitive specifies a second size for the primitive type greater than the first size.

21. The method according to claim 19, wherein:

the first layout description for the primitive type specifies a first alignment restriction for the primitive type; and the second layout description for the primitive specifies a second alignment restriction for the primitive type stricter than the first alignment restriction.

* * * * *

UNITED STATES PATENT AND TRADEMARK OFFICE
CERTIFICATE OF CORRECTION

PATENT NO.        : 7,093,263 B1
APPLICATION NO.   : 09/512621
DATED             : August 15, 2006
INVENTOR(S)       : Harlan Sexton et al.

Page 1 of 1

It is certified that error appears in the above-identified patent and that said Letters Patent is hereby corrected as shown below:

(56) References Cited

Please insert --

| Patent No. | Date | Inventor | Class |
|---|---|---|---|
| 5,257,371 * | 10/1993 | Anezaki | 707/103R |
| 5,590,327 * | 12/1996 | Biliris et al. | 709/100 |
| 5,794,256 * | 8/1998 | Bennett et al. | 707/206 |
| 5,903,899 * | 5/1999 | Steele, Jr. | 707/206 |
| 6,023,704 * | 2/2000 | Gerard et al. | 707/103R |
| 6,408,305 * | 6/2002 | Stoodley | 707/103R |

Signed and Sealed this

Seventeenth Day of October, 2006

JON W. DUDAS
*Director of the United States Patent and Trademark Office*